United States Patent [19]

Leiber

[11] Patent Number: 4,534,171
[45] Date of Patent: Aug. 13, 1985

[54] HYDRAULIC DUAL-CIRCUIT TANDEM MAIN BRAKE CYLINDER

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 548,735

[22] Filed: Nov. 4, 1983

[30] Foreign Application Priority Data

Jan. 14, 1983 [DE] Fed. Rep. of Germany ....... 3301042

[51] Int. Cl.³ .............................................. B60T 13/14
[52] U.S. Cl. ........................................ 60/551; 60/553; 60/554; 60/562; 60/563
[58] Field of Search .............. 60/554, 550, 553, 547.1, 60/551, 562, 563; 91/387, 372; 267/166, 167, 60

[56] References Cited

U.S. PATENT DOCUMENTS

| | | | |
|---|---|---|---|
| 3,334,548 | 8/1967 | Van House | 60/550 |
| 3,751,025 | 8/1973 | Beery et al. | 267/166 |
| 4,137,718 | 2/1979 | Belart | 60/562 |
| 4,218,958 | 8/1980 | Katz et al. | 91/372 |
| 4,326,379 | 4/1982 | Dauvergne | 60/550 |
| 4,366,745 | 1/1983 | Belart | 91/372 |

FOREIGN PATENT DOCUMENTS 82367 6/1983 European Pat. Off. ........... 60/547.1

Primary Examiner—Robert E. Garrett
Assistant Examiner—Richard S. Meyer
Attorney, Agent, or Firm—Edwin E. Greigg

[57] ABSTRACT

A hydraulic dual-circuit tandem main brake cylinder which includes at least one closed brake circuit (I) having a brake piston. This brake piston is actuated by means of the pressure fed into a pressure chamber by means of a brake control valve with a travel simulator spring. Adjoining this pressure chamber is also an auxiliary piston device, which comprises an auxiliary piston and a tappet passing therethrough and connected indirectly with the brake pedal. A highly progressive spring is fastened between the auxiliary piston and the tappet; this spring predominantly determines the pedal characteristic.

12 Claims, 3 Drawing Figures

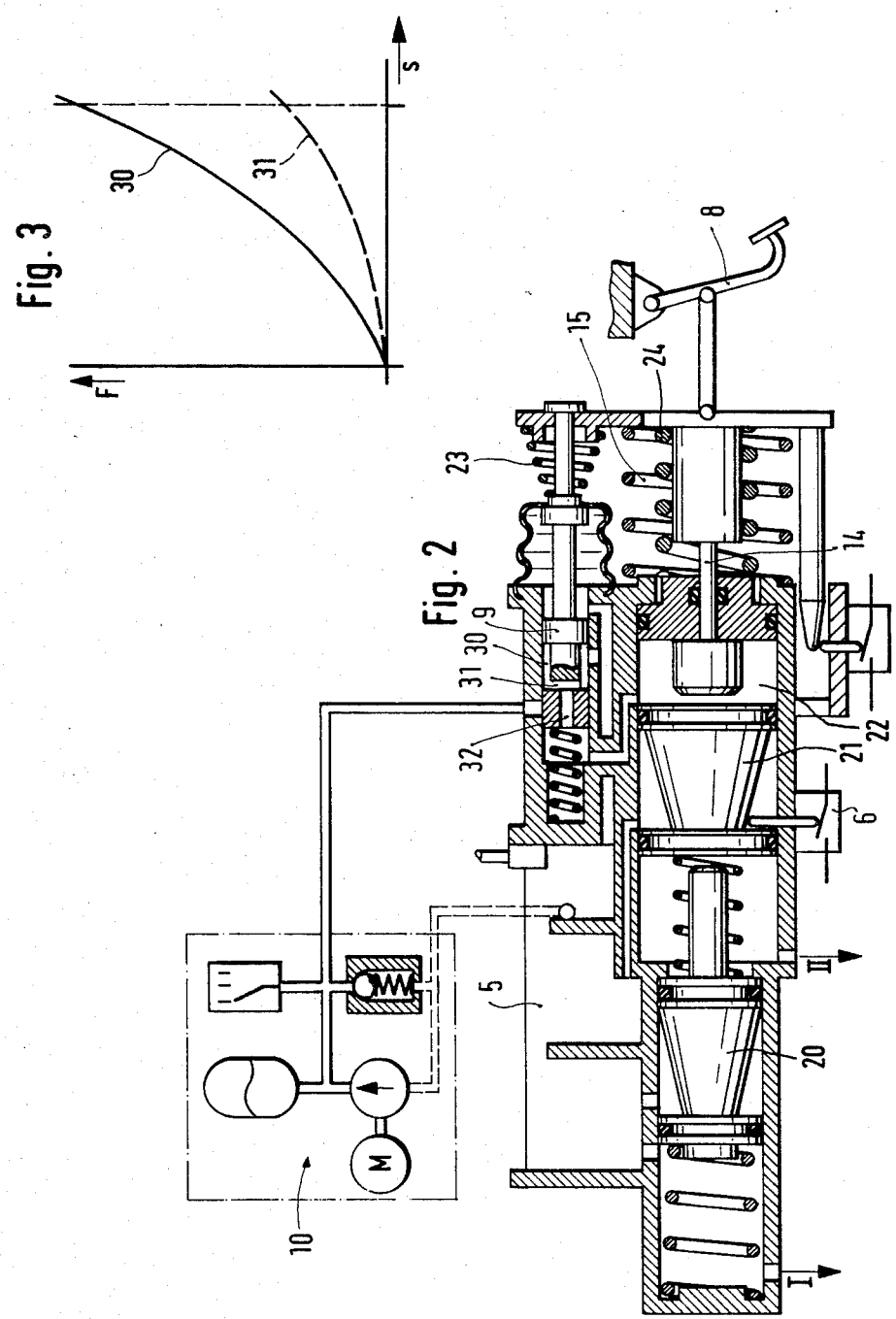

HYDRAULIC DUAL-CIRCUIT TANDEM MAIN BRAKE CYLINDER

BACKGROUND OF THE INVENTION

The invention relates to a hydraulic dualcircuit tandem main brake cylinder for vehicle brake systems. The system has at least one brake piston for one closed brake circuit. A control valve device is actuatable via a pedal-actuated control tappet and includes a travel simulator spring and directs a control pressure into a pressure chamber adjoining at least one piston. An auxiliary piston member adjoins the pressure chamber, which member comprises an auxiliary piston and a tappet passing therethrough which is actuated by the pedal. A progressive spring is fastened in place between one side of the auxiliary piston remote from the pressure chamber and the tappet passing through this auxiliary piston. Such an apparatus is disclosed in German Patent Application P 32 10 735.8.

The essence of the above listed patent is that the pressure directed into the pressure chamber has a limited feedback effect as a reactionary force on the pedal via the brake valve, but a very much greater effect on the pedal via the tappet passing through the auxiliary piston.

In the structure of the above listed patent, a disadvantageous feature is related to the simulator spring, which upon a quick actuation of the brake pedal, a phase displacement takes place between the pedal force exerted and the feedback to the pedal of the brake pressure effected.

OBJECT AND SUMMARY OF THE INVENTION

The embodiment according to the invention substantially avoids this disadvantage because it includes a progressively embodied spring that substantially determines the pedal characteristic. Only to a small extent is the pedal characteristic still determined by the superimposed effect of the simulator spring. By contrast, the highly progressively embodied spring generates such a reactionary force upon the tappet passing through the auxiliary piston that before comparable pedal travel has been accomplished, braking pressure in the pressure chamber and in the brake circuits will already have been generated.

While in the above listed patent it was considered necessary that a means of piston arrest be provided in the event of a failure in the pressure supply, in order to avoid overly long idle pedal travel distances, such a means of piston arrest can now be dispensed with because of the highly progressively embodied spring.

The invention will be better understood and further objects and advantages thereof will become more apparent from the ensuing detailed description of two preferred embodiments taken in conjunction with the drawings.

BRIEF DESCRIPTION OF THE DRAWINGS

FIGS. 1 and 2 show two exemplary embodiments of the invention; and

FIG. 3 illustrates the characteristics of springs.

DESCRIPTION OF THE PREFERRED EMBODIMENTS

Figure 1:
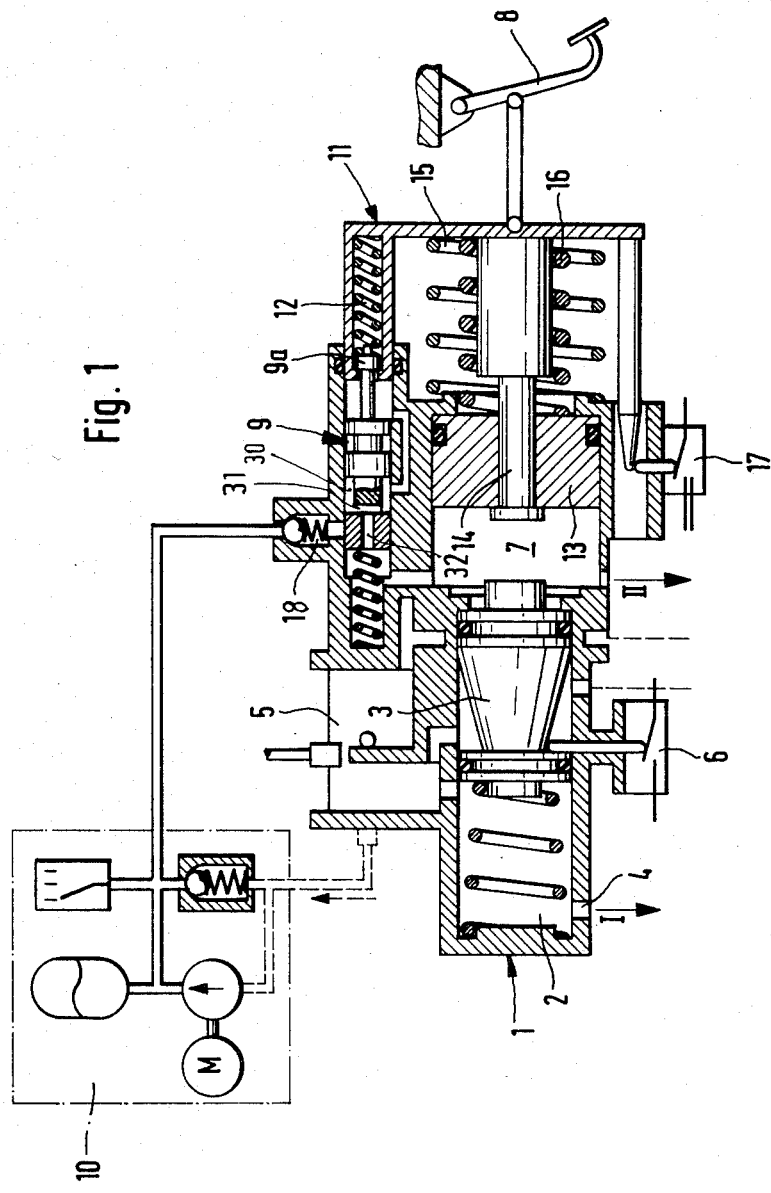

FIG. 1 shows a housing 1 of a brake force booster and a brake cylinder 2 embodied therein. The brake cylinder 2 communicates, in the initial position of a brake piston 3, with a fluid reservoir 5. Connected to the outlet 4 of the brake cylinder 2 is a brake circuit I; brake dispositions of this kind, having brake pistons, are known as closed brake circuits. Adjoining the brake piston 3, which upon displacement actuates a monitoring switch 6, is a pressure chamber 7, into which pressure from an external pressure source 10 is fed by means of the control valve 9 upon a deflection of the pedal 8. The actuation of the control valve 9 is effected via a travel simulator spring 12 which is effective between a part 11, which is displaceable with the pedal 8, and the control valve 9. The pressure fed by means of the control valve 9 has a feedback effect on the pedal via a spring receiver 9a and the spring 12. The control valve 9 has an annular cut-away section to form an annular chamber 30 and is provided with a radial passage 31 and an axial passage 32 through which fluid passes from the pressure source 10.

On the right side, the pressure chamber 7 is defined by an auxiliary piston device, which is embodied by an auxiliary piston 13 and a tappet 14 of relatively small diameter which passes through the auxiliary piston 13. A brake circuit II is connected to an outlet to the pressure chamber 7.

A restoring spring 15 is disposed between the housing 1 and the part 11. A highly progressive spring 16 is also fastened between the auxiliary piston 13 and the part 11, with which the tappet 14 is firmly connected; that is, the spring 16 provides a restoring force which increases highly exagerratedly in accordance with the deflection rather than merely directly in proportion thereto. The deflection travel is monitored by means of a switch 17 actuated upon the deflection of the part 11.

If braking occurs, then the part 11 and the tappet 14 are displaced. The control valve 9 is thereby opened, and pressure is built up in the pressure chamber 7 via the check valve 18 in the pressure line, passage 31, and passage 32. Both the pressure fed in (via the tappet 14) and the spring 16 have a feedback effect on the pedal 8. The spring 12 also contributes to a small extent to this feedback effect. The pressure fed into the pressure chamber 7 acts upon the brakes of the open brake circuit II, but also displaces the piston 3 which is smaller in cross section than the auxiliary piston 13, and thus also generates the braking pressure in the closed brake circuit I.

If the external pressure source 10 fails, then the auxiliary piston 13 together with the tappet 14 acts as a brake piston, which because of the check valve 18 both circuits I and II are supplied with pressure.

According to the other form of embodiment shown in FIG. 2, two tandem-disposed, stepped brake pistons 20 and 21, corresponding to the piston 3 of FIG. 1, are provided, by way of which the two closed brake circuits I and II are supplied with pressure. The displacement of the brake piston 21 that is closer to the pedal is effected by the pressure fed into the pressure chamber 22, which in this case does not, however, have any outlet for a brake circuit.

In FIG. 3, the characteristics 30 and 31 of the highly progressive spring 16 and the more weakly embodied simulator spring 12 are shown. These springs are adapted to one another such that at every operational point the ratio of the spring forces is at least approximately equally high. From the steepness of the characteristic 30 it is clear that the spring 16 is embodied in a highly progressive manner.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A hydraulic dual-circuit brake system including first and second main brake cylinders in tandem, comprising at least one brake piston for a closed brake circuit, a brake fluid control valve which is actuatable via a brake pedal-actuated body part in combination with a travel simulator spring which acts upon said body part and said control valve, said control valve controls a control pressure fluid flow from a control pressure source into a pressure chamber which is adjoined by a control face of at least one brake piston, and an auxiliary piston adjoining the pressure chamber, said auxiliary piston including a tappet which passes through and is displaceably supported in the auxiliary piston and which is actuated by movement of said pedal and said body part, a progressive spring fastened between one side of the auxiliary piston and said brake pedal-actuated body part remote from the pressure chamber and coaxial with the tappet passing through said auxiliary piston, characterized in that said progressive spring is directed against said auxiliary piston and has a highly progressive spring characteristic and as a result effects a highly progressive pedal characteristic.

2. A tandem main brake cylinder as defined by claim 1, in which two tandem-disposed brake pistons are used to supply two closed brake circuits, and a pressure in the pressure chamber directly serves solely as a control pressure for one of said brake pistons.

3. A tandem main brake cylinder as defined by claim 1, characterized in that an open brake circuit II is connected to the pressure chamber.

4. A tandem main brake cylinder as defined by claim 1, characterized in that said first and second main brake cylinders have different diameters.

5. A tandem main brake cylinder as defined by claim 2, characterized in that said first and second main brake cylinders have different diameters.

6. A tandem main brake cylinder as defined by claim 3, characterized in that said first and second main brake cylinders have different diameters.

7. A tandem main brake cylinder as defined by claim 1, characterized in that said travel simulator spring and said progressive spring are adapted to one another by said brake pedal-actuated body part in such a manner that they have a constant force ratio in terms of travel.

8. A tandem main brake cylinder as defined by claim 2, characterized in that said travel simulator spring and said progressive spring are adapted to one another by said brake pedal-actuated body part in such a manner that they have a constant force ratio in terms of travel.

9. A tandem main brake cylinder as defined by claim 3, characterized in that said travel simulator spring and said progressive spring are adapted to one another by said brake pedal-actuated body part in such a manner that they have a constant force ratio in terms of travel.

10. A tandem main brake cylinder as defined by claim 4, characterized in that said travel simulator spring and said progressive spring are adapted to one another by said brake pedal-actuated body part in such a manner that they have a constant force ratio in terms of travel.

11. A tandem main brake cylinder as defined by claim 5, characterized in that said travel simulator spring and said progressive spring are adapted to one another by said brake pedal-actuated body part in such a manner that they have a constant force ratio in terms of travel.

12. A tandem main brake cylinder as defined by claim 6, characterized in that said travel simulator spring and said progressive spring are adapted to one another by said brake pedal-actuated body part in such a manner that they have a constant force ratio in terms of travel.

* * * * *